US011250502B2

(12) United States Patent
Harold et al.

(10) Patent No.: US 11,250,502 B2
(45) Date of Patent: Feb. 15, 2022

(54) METHOD, APPARATUS AND SYSTEM FOR AUTOMATICALLY GENERATING A REPORT

(71) Applicant: Insperity Services, L.P., Kingwood, TX (US)

(72) Inventors: Michelle Harold, Maysville, GA (US); Mark Breuer, Kingwood, TX (US); John F Tangredi, Santa Ana, CA (US)

(73) Assignee: Insperity Services, L.P., Kingwood, TX (US)

( * ) Notice: Subject to any disclaimer, the term of this patent is extended or adjusted under 35 U.S.C. 154(b) by 622 days.

(21) Appl. No.: 14/494,501

(22) Filed: Sep. 23, 2014

(65) Prior Publication Data

US 2015/0095076 A1 Apr. 2, 2015

Related U.S. Application Data

(60) Provisional application No. 61/883,939, filed on Sep. 27, 2013.

(51) Int. Cl.
*G06Q 10/00* (2012.01)
*G06Q 40/02* (2012.01)
(Continued)

(52) U.S. Cl.
CPC ....... *G06Q 40/025* (2013.01); *G06Q 10/0631* (2013.01); *G06Q 10/10* (2013.01); *G06Q 20/10* (2013.01); *G06Q 20/34* (2013.01); *G06Q 20/354* (2013.01); *G06Q 20/40* (2013.01); *G06Q 20/409* (2013.01); *G06Q 20/4037* (2013.01)

(58) Field of Classification Search
CPC .. G06Q 40/025; G06Q 10/0631; G06Q 10/10; G06Q 20/10; G06Q 20/34; G06Q 20/354; G06Q 20/40; G06Q 20/4037; G06Q 20/409
See application file for complete search history.

(56) References Cited

U.S. PATENT DOCUMENTS 5,265,008 A * 11/1993 Benton ................. G06Q 20/04
235/379
5,832,453 A * 11/1998 O'Brien ................ G06Q 10/02
705/6

(Continued)

OTHER PUBLICATIONS

Hua Chai, Honglei Zhang, Wenbing Zhao, P. Michael Melliar-Smith, and Louise E. Moser (Toward Trustworthy Coordination of Web Services Business Activities, IEEE Transactions on Services Computing, vol. 6, No. 2, Apr.-Jun. 2013). (Year: 2013).*

(Continued)

*Primary Examiner* — Hafiz A Kassim
(74) *Attorney, Agent, or Firm* — Williams Morgan, P.C.

(57) ABSTRACT

Embodiments herein provide for a method, system, and apparatus for automatically providing a report. Data associated with an activity relating to a user of an account is received. A determination is made as to whether the activity relates to funding of the account. In response to the activity relating to the funding, a determination is made as to whether the data indicates that a report is to be automatically generated based upon a predetermined rule. The report is automatically generated based upon determining that the data indicates that the report is to be automatically generated.

13 Claims, 11 Drawing Sheets

(51) Int. Cl.
  *G06Q 20/40* (2012.01)
  *G06Q 10/06* (2012.01)
  *G06Q 20/34* (2012.01)
  *G06Q 10/10* (2012.01)
  *G06Q 20/10* (2012.01)

(56) References Cited

U.S. PATENT DOCUMENTS

| | | | | |
|---|---|---|---|---|
| 5,899,981 | A * | 5/1999 | Taylor | G06Q 20/201 705/20 |
| 6,446,048 | B1 * | 9/2002 | Wells | G06Q 20/102 705/35 |
| 6,578,015 | B1 * | 6/2003 | Haseltine | G06Q 20/102 705/34 |
| 7,433,836 | B1 * | 10/2008 | August | G06Q 10/10 705/30 |
| 9,779,384 | B2 * | 10/2017 | Fredericks | G06Q 10/10 |
| 2002/0046058 | A1 * | 4/2002 | Brown | G06Q 20/10 705/35 |
| 2002/0052852 | A1 * | 5/2002 | Bozeman | G06Q 20/10 705/64 |
| 2002/0095376 | A1 * | 7/2002 | Likourezos | G06Q 40/00 705/40 |
| 2002/0099608 | A1 * | 7/2002 | Pons | G06Q 20/04 705/21 |
| 2002/0152101 | A1 * | 10/2002 | Lawson | G06Q 10/025 705/6 |
| 2003/0078883 | A1 * | 4/2003 | Stewart | G06K 7/084 705/39 |
| 2003/0088487 | A1 * | 5/2003 | Cheng | G06Q 10/10 705/30 |
| 2004/0002876 | A1 * | 1/2004 | Sommers | G06Q 10/02 705/6 |
| 2004/0249745 | A1 * | 12/2004 | Baaren | G06Q 20/10 705/39 |
| 2005/0015272 | A1 * | 1/2005 | Wind | G06Q 10/02 705/44 |
| 2005/0125317 | A1 * | 6/2005 | Winkelman, III | G06Q 20/04 705/30 |
| 2005/0222944 | A1 * | 10/2005 | Dodson, Jr. | G06Q 10/10 705/39 |
| 2006/0080126 | A1 * | 4/2006 | Greer | G06Q 20/10 705/35 |
| 2006/0206363 | A1 * | 9/2006 | Gove | G06Q 10/02 705/6 |
| 2006/0242154 | A1 * | 10/2006 | Rawat | G06F 16/168 |
| 2006/0247993 | A1 * | 11/2006 | Scanlan | G06Q 40/00 705/35 |
| 2007/0083401 | A1 * | 4/2007 | Vogel | G06Q 10/02 705/5 |
| 2007/0083449 | A1 * | 4/2007 | Roberts | G06Q 20/10 705/35 |
| 2008/0010202 | A1 * | 1/2008 | Schwarz, Jr. | G06Q 40/00 705/41 |
| 2008/0015985 | A1 * | 1/2008 | Abhari | G06Q 20/10 705/42 |
| 2008/0319808 | A1 * | 12/2008 | Wofford | G06Q 30/06 705/6 |
| 2009/0099965 | A1 * | 4/2009 | Grant, IV | G06Q 20/105 705/41 |
| 2009/0119190 | A1 * | 5/2009 | Realini | G06Q 20/04 705/30 |
| 2009/0265232 | A1 * | 10/2009 | Gopalakrishnan | G06Q 10/10 705/35 |
| 2009/0271262 | A1 * | 10/2009 | Hammad | G06Q 20/322 705/14.33 |
| 2010/0017316 | A1 * | 1/2010 | Joseph | G06Q 10/10 705/34 |
| 2010/0299253 | A1 * | 11/2010 | Patterson | G06Q 40/02 705/40 |
| 2011/0137768 | A1 * | 6/2011 | Onishi | G06Q 10/047 705/30 |
| 2011/0155800 | A1 * | 6/2011 | Mastrangelo | G06Q 20/352 235/379 |
| 2011/0258005 | A1 * | 10/2011 | Fredericks | G06Q 10/02 705/5 |
| 2012/0059745 | A1 * | 3/2012 | Fredericks | G06Q 10/10 705/30 |
| 2012/0185368 | A1 * | 7/2012 | Schloter | G06Q 40/12 705/30 |
| 2012/0209640 | A1 * | 8/2012 | Hamper | G06Q 10/10 705/5 |
| 2012/0290422 | A1 * | 11/2012 | Bhinder | G06Q 20/0453 705/21 |
| 2013/0117183 | A1 * | 5/2013 | Bozeman | G06Q 20/04 705/44 |
| 2013/0226750 | A1 * | 8/2013 | Friedholm | G06Q 10/1057 705/34 |
| 2013/0290178 | A1 * | 10/2013 | Masie | G06Q 20/40 705/40 |

OTHER PUBLICATIONS

PCT Application No. PCT/US2014/057908; International Search Report dated Mar. 4, 2015; 3 pgs.
PCT Application No. PCT/US2014/057908; Written Opinion of the International Search Authority; dated Mar. 4, 2015; 8 pgs.
PCT Application No. PCT/US2014/057910; International Search Report dated Feb. 6, 2015; 3 pgs.
PCT Application No. PCT/US2014/057910; Written Opinion of the International Search Authority; dated Feb. 6, 2015; 8 pgs.
PCT Application No. PCT/US2014/057914; International Search Report dated Feb. 4, 2015; 4 pgs.
PCT Application No. PCT/US2014/057914; Written Opinion of the International Search Authority; dated Feb. 4, 2015; 8 pgs.
PCT Application No. PCT/US2014/057915; International Search Report dated Jan. 26, 2015; 3 pgs.
PCT Application No. PCT/US2014/057915; Written Opinion of the International Search Authority; dated Jan. 26, 2015; 8 pgs.
PCT Application No. PCT/US2014/057916; International Search Report dated Feb. 2, 2015; 3 pgs.
PCT Application No. PCT/US2014/057916; Written Opinion of the International Search Authority; dated Feb. 2, 2015; 8 pgs.

* cited by examiner

METHOD, APPARATUS AND SYSTEM FOR AUTOMATICALLY GENERATING A REPORT

The present application claims the benefit under 35 U.S.C. § 119(e) of prior-filed provisional application 61/883,939, filed Sep. 27, 2013, the disclosure of which is hereby incorporated by reference herein.

BACKGROUND OF THE INVENTION

Technical Field

Generally, the disclosed embodiments relate to automated funding, and, more particularly, to provide automated generation of a report, such as an expense report.

Description of the Related Art

There have been many advancements in the area of financial transactions. Often, organizations such as corporations rely on employees or agents to act on their behalf performing various tasks in the interest of the organization. When performing these tasks, the employees or agents may incur expenses. In some cases, state of the art methods for providing funding for such expenses include having the employee or agent incur the cost themselves, and then reimbursing that amount to the employee or agent. Other state of the art methods include providing funding prior to the performance of a task or travel on behalf of the organization, and having an employee, or agent, utilize the provided funds for expenses. These methods can be inaccurate and cumbersome, reducing efficiency.

Some organizations have attempted to make the funding process more efficient. For example, some organizations attempt to increase efficiency by providing for receiving a request for funding and then having the request manually studied and approved, after which such requested funding is possibly granted. Further, funding of future expenses may depend on previous funding. However, information relating to previous funding (e.g., expense reports) and expenditures may not be readily available prior to making a decision regarding future funding and expenditures. Moreover, employees may provide belated expense or financial reports, further exasperating the problem. State of the art funding and expenditure reporting processes can be slow and cumbersome, and thus problems may result, e.g., the proper funding may not arrive in time because information regarding previous expenditures or financial status was not readily available.

In order to initiate a transaction, a range of actions generally have to take place. This may include cumbersome paperwork, requests, approvals, etc. For example, if a funding for a particular activity (e.g., a project, recurring business travel, etc.) is approved, additional funding of that activity may require manual steps such as seeking approval and awaiting approval for additional funding, etc. Further before the requested funding can be approved, information regarding previous expenditures (e.g., expense reports), as well as current financial status (e.g., financial reports) may be required. This may create an additional administrative burden on an organization. Further, needless delays may occur as a result of manually seeking information regarding previous expenditures and current financial status. Moreover, employees may lack sufficient incentives to timely complete certain activities, such as providing expense reports and/or financial reports). The state of the art lacks an efficient means to prevent delays in receiving information regarding previous expenditures and current financial status. These delays may interfere in performing efficient execution with regard to planning and funding of activities of employees.

SUMMARY OF EMBODIMENTS

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Embodiments herein provide for a method, system, and apparatus for automatically providing a report. Data associated with an activity relating to a user of an account is received. A determination is made as to whether the activity relates to funding of the account. In response to the activity relating to the funding, a determination is made as to whether the data indicates that a report is to be automatically generated based upon a predetermined rule. The report is automatically generated based upon determining that the data indicates that the report is to be automatically generated.

BRIEF DESCRIPTION OF THE FIGURES

The disclosed subject matter will hereafter be described with reference to the accompanying drawings, wherein like reference numerals denote like elements, and.

DETAILED DESCRIPTION

Figure 1:
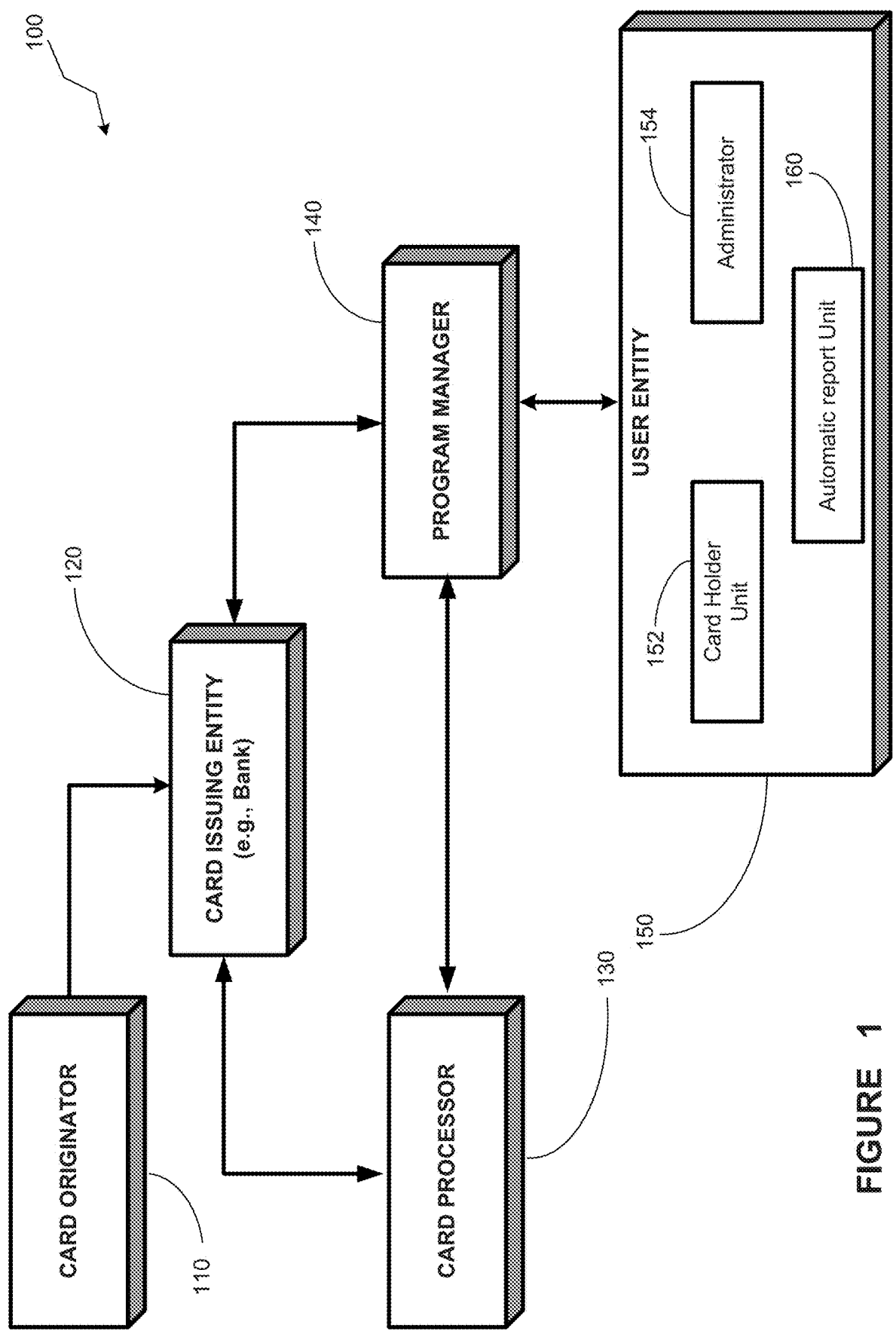
FIG. 1 provides a system for providing an automated process for generating a report, in accordance with some embodiments of the present disclosure.

Illustrative embodiments of the invention are described herein. In the interest of clarity, not all features of an actual implementation are described in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

Embodiments herein provide for automatically generating a report, such as an expense report, a financial report, a cost estimate report, stock report, a tax report, etc. The reports that are automatically generated by embodiments herein may relate to transactions involving a funding for a user of a payment mechanism (e.g., a debit card, a pre-paid card, a credit card, an electronic payment device, or a payment application capable of being executed in a mobile device, a tablet computer, a laptop computer, or a desktop computer).

In some embodiments, information from the user regarding an activity involving funding may be used to trigger an automated generation of a report, such as an expense report. For example, a module (e.g., a processor coupled to memory comprising a program that can be executed) may automatically scan across various data sets for a report-trigger based upon scanned data and/or information from a user of an account or card. In some cases, relevant emails, project entries, trip schedules, etc., may be detected by the module and an automatic generation of a report may be triggered. The automatic generation of a report may include obtaining relevant information relating to the funding, information relating to completion of the activity, the expenditures incurred, and/or the like, wherein this information may be used to automatically generate one or more reports.

In some embodiments, a module may automatically scan for a triggering event that may trigger an automatic generation of a report. For example, the module may detect an occurrence of an event that requires a report. In some cases, the completion of a company trip, completion of a project, expiration of a time period for replenishing an account, request for funding, etc., may trigger a report, such as an expense report or a financial report that may be used to determine whether sufficient funding is available for approving a funding request.

In other embodiments, a module may automatically monitor a threshold for triggering an automatic generation of a report. For example, a temporal threshold may be monitored such that after passing of a threshold time period, an automatic generation of a report may be performed. Another example of triggering a transaction based upon a threshold may include the depletion of funds in a project or card account below a predetermined threshold amount. In such cases, an automatic financial and/or expense report may be generated for use in determining whether to restore adequate funding for on-going or upcoming activities of a user of an account or card.

Some embodiments herein provide for organizations (e.g., corporations) to quickly and efficiently transfer company funds to and from employees in a real time or a near real time basis using a linked system of pre-paid debit cards or other payment mechanisms, such as credit cards, wireless payment devices, mobile phone payment modules or applications, etc. Due to the automatic nature of such a system, it may be desirable to provide automated reports that reflect the automatic funding transactions. The component of automatic funds request, funds approval, expense and/or financial reports, etc., may be managed through a proprietary module, which may be standalone, intranet, Internet, and/or and mobile application based. The module may be a software module, a hardware module, a firmware module, or a combination thereof. Operation of the system may be facilitated by a graphical user interface (GUI) that may provide interaction between the system and a user or a program manager via various avenues, such as a remote computer (e.g., a laptop) or a mobile device, such as a cellular phone.

In some embodiments, remote devices (e.g., mobile phones such as smartphones, computers such as laptop computers tablet computers, desktop computers, etc.), as well as modules (e.g., software modules, hardware modules, firmware modules, etc.) or applications (e.g., proprietary mobile application technology) to automatically and proactively send communications (e.g., notifications) regarding the need for, approval or rejection, reallocation, and distribution of funds within a workflow of an organization, such as a corporation. The notifications may be made via a variety of mediums, such as text messaging, email messages, social network venues, chat applications, paging applications, and/or the like.

In one embodiment, predetermined rules may be implemented to control the operation of automatic generation of reports regarding expenditures, allocating funds for use by employees for spending required for the business, etc. This automatic generation of reports may be part of the broader funding and communication components of the end to end expense management and reporting process automated by the integrated solution. In some embodiments, based on a trigger threshold or event detected by a funding system (e.g., a proprietary solution), funds may be distributed and/or loaded onto a payment mechanism (e.g., debit card, pre-paid card, credit card, etc.) based upon predetermined rules established by the end user, account manager and/or other designated individual(s). The details of these activities may be automatically noted, organized, and presented in a report. The trigger event for automatically generating a report may be one of several events, such as approval or conclusion of a business trip, depletion of funds below a predetermined threshold in an account, a notice from a user, a request for an expense report, a time threshold, and/or the like.

Embodiments provided herein may be applicable to a variety of contexts, such as corporation, organizations within a corporation, employee expense advances, third party funding (e.g., short-term loans, cash-advance operations, pay-check advance loans, title-advance loans, tax-refund loans, etc.). The funds provided by embodiments herein may include various forms of funding, including cash checks, pre-paid cards, credit cards, electronic payment devices or systems, and/or the like.

Turning now to FIG. 1, a block diagram depiction of a funds management system for providing an automated triggered transaction, in accordance with some embodiments, is illustrated. The system 100 may comprise a card originator 110, which provides a financial transaction mechanism for performing financial transactions. The card originator 110 may provide a transaction mechanism that is a spendable transaction card, such as a debit card or a credit card issued by an entity such as Visa, Master Card, American Express, Discover Card, etc. The card originator 110 may provide other transaction mechanisms for facilitating transactions, e.g., wireless transfer of funds from an electronic device, such as a stand-alone transaction electronic device, an application on a remote portable computer, or a mobile device, such as a cell phone. The card originator 110 may be in communication with a card issuing entity 120, such as a bank. The card issuing entity 120 may be a principal member of the card originator 110. For example, the card issuing entity 120 may enter into an agreement with the card originator 110 to provide funding for the transaction mechanism provided by the card originator 110.

The system 100 may also comprise a program manager 140, which may be an entity that is capable of managing manual and automated financial transactions between a user entity 150 and a card processor 130. The card processor 130 may be capable of processing a financial transaction initiated by a user utilizing a transaction mechanism provided by the card originator 110.

The user entity 150 may be an organization, such as a corporation, that utilizes the automated transaction request and approval provided by the system 100. For example, the user entity 150 may be a corporation that signs on with the program manager 140 to manage the automated request and transaction provided by the system 100. The program manager 140 may provide an infrastructure for members of the user entity 150 to request funding for an expense and receive automated approval, in some embodiments, in real time or near real time. In some embodiments, the approval may be provided manually and in other embodiments, the approval may be provided automatically. The approval may be provided automatically based upon rules-based, threshold-based, and/or event-based scenarios.

The program manager 140 may be an entity that provides management services that facilitates automated request and approval of funding. One example of a program manager 140 is Insperity, Inc. The card issuing entity 120 may be a member of the card originator 110. The card originator 110 and the card issuing entity 120 may enter into an agreement with the program manager 140 for providing a business model to market and distribute various transaction mechanisms, such as the debit cards and credit cards. The program manager 140 may enter into an agreement with the card processor 130, wherein the agreement may be approved by the card issuing entity 120. This agreement may comprise provisions for interfacing with networks described herein for accounting of transactions performed using transaction mechanisms, authorization and settlement of accounts, etc. The program manager 140 supports automatic request, notification and approval of funding within the user entity 150.

The user entity 150 may comprise an automated report unit 160, a card holder unit 152 and an administrator 154. The automated report unit 160 is capable of triggering an automated generation of one or more reports based upon various factors, such as an input from a user, completion of a trip or project, data relating to an activity of a user, a request for a report, a triggering event, a threshold that is met, etc. Upon triggering an automated generation of a report, the selected report, which may relate to a user associated with the user entity 150, may be generated. A more detailed description of the automated report unit 160 is provided in FIG. 6 and accompanying description below.

The card holder unit 152 may be a user of the financial transaction mechanism. The administrator 154 may be an entity that is capable of approving (a) request(s) for funds. The administrator 154 may prompt funding of transaction mechanism, e.g., the card, in response to the approval of a request for funding.

The administrator 154 may exercise various controls over the operation of the card program, which includes evaluating a funding request, providing approvals for the requests, prompting modification of the requests, providing funding responsive to the requests, scheduling a transfer of funds, managing expense cards, managing groups that may use one or more expense cards, withdrawing or pulling back funds from previously allowed expense funding, etc. The administrator 154 may perform the function of various administrative tasks over an individual user or a group of users. In alternative embodiments, a separate group administrator may provide for performing various administration functions for controlling the group expense activities.

In some embodiments, the user entity 150 may also comprise a group manager. The group manager may be part of the administrator 154, or in alternative embodiments may be a separate entity. In some embodiments, the group manager may be limited to the tasks of managing cards, approval or denial of expense requests, status views, report generation, etc. In some embodiments, the group manager may be restricted to controlling the operation of approvals, etc. within one or more groups that is managed by the group manager. Alternatively, the functions of the group manager may be encompassed by the administrator 154. The duties of the administrator 154 may be performed manually and/or automatically using software, hardware, and/or firmware modules that may be programmed to implement rules-based, threshold-based, and/or event-based protocols.

The term "card" as used herein, may include various financial transaction mechanisms, such as credit cards, debit cards, auto payment, electronic devices, and transaction applications (apps) residing on an electronic device, such as a mobile device, or portable computer, a tablet computer, etc. In some embodiments, the term "expense card" may be utilized to signify the card described above.

In order to deploy the system described in FIG. 1, a set-up and configuration process may be performed. For example, the configuration and set-up process may include confirming and/or creating a payment method for one or more expense cards. In some embodiments, a group may be created, wherein a plurality of expense cards may be funded from a single account or a group of accounts that are controlled by a single entity, e.g., a group administrator. Further, the payment method may be associated with a financial institution such as the card issuing entity 120. An expense card management role may be assigned to an expense card administrator, such as the administrator 154. Further, an expense card group manager role may be assigned to managers of the user entity 150. The group manager may be able to approve and manage the expense card groups. The expense card groups may include one or more card holder units 152. The expense card group manager may be an automated entity and may be comprised of software or hardware module that is capable of receiving requests, demanding modifications to the requests, providing approval of funds requests, and/or prompting funding of an expense card upon approval of a funding request.

In an alternative embodiment, once expense card groups are created, a card holder role may be assigned to a card holder unit 152, e.g., an employee of a corporation. The employee may be issued an expense card and further, the employee may be assigned to a particular expense card group. Funds may then be transferred to the expense cards in the group and an automated request and approval process may be facilitated by the program manager 140 and the user entity 150. The administrator 154 may provide for a graphical user interface (GUI) for performing the set up described above.

Figure 2:
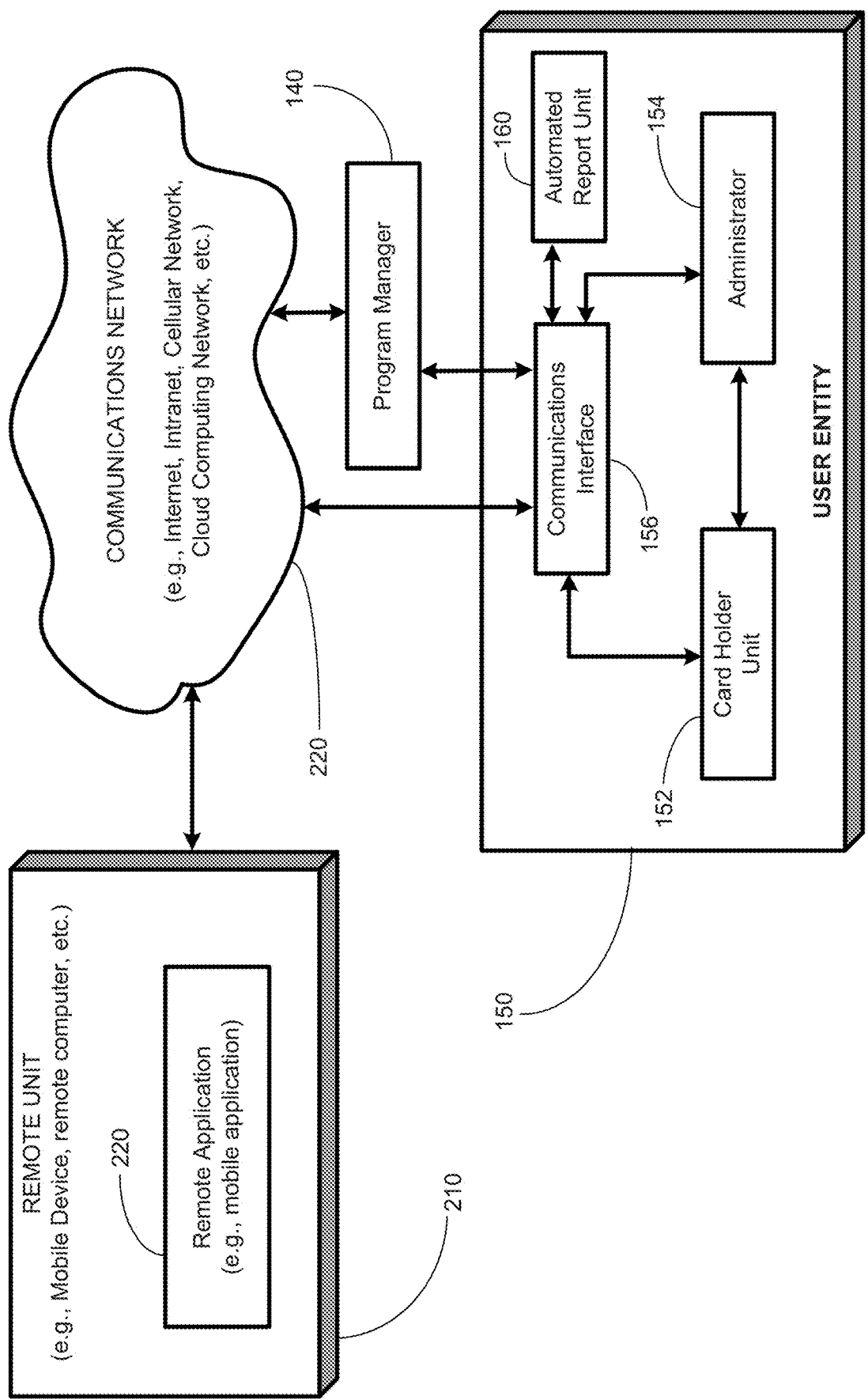
FIG. 2 illustrates a stylized depiction of a remote unit in communications with a user entity of the system of FIG. 1, in accordance with some embodiments of the present disclosure.

Turning now to FIG. 2, a stylized, blocked diagram depiction of a remote unit in communication with the user entity of FIG. 1, in accordance with some embodiments, is illustrated. A remote unit 210 may be one of several types of communications and/or computing devices that may interface with the user entity 150. For example, the remote unit 210 may be a mobile device, a remote computer, a tablet computer, a smart watch device, a wearable computing device, a desktop computer, or any other device that has communications and/or computing capabilities. The term "communications" may include audio communications, radio communications, electronic communications, data communication, and/or analog communications.

The remote unit 210 may communicate with the user entity 150 via a communications network 220. The communications network 220 may comprise the Internet, an intranet, a cloud computing network, a peer-to-peer network, a closed communication network system, and/or the like. The communication network 220 provides for communications links between the remote unit 210 and the program manager 140 and the user entity 150.

In order to facilitate communications with the user entity 150, the user entity 150 may comprise a communications interface 156. The communications interface 156 is capable of providing a communications link between the remote unit 210 and the user entity 150. The communications interface 156 may comprise various hardware, firmware and/or software modules that provide for digital and/or analog communications between the remote unit 210 and the user entity 150. In this manner, the remote unit 210 may be able to perform various functions involving the cardholder unit 152 and the administrator 154, such as requesting or providing approvals for expenses, funding an expense card associated with a card holder, and/or various activities concerning the administrator 154. Therefore, a user utilizing the remote unit 210 may be able to achieve real time or near real time approval of an expense and/or funding of an expense card via the communications network 220. Therefore, a manager in charge of approving transactions or funding may, in real time, provide such funding and approvals. Similarly, an automated approval may also be provided based upon a request received via the communications network 220. In alternative embodiments, the remote unit 210 may be a computer system, which may be comprise a software, hardware and/or firmware module that is configured to provide for automated approvals, funding based upon a funding request, and/or seek approvals or funding.

The automated report unit 160 of the user entity 150 may also be coupled to the communications interface 156. Various reports described herein may be provided by the automated report unit 160. Various data (e.g., user data, event data, threshold data, activity data etc.) may be received by the automated report unit 160 via the communication interface 156. These data sets may be used by the automated report unit 160 to trigger the performance of a generation of a report (e.g., an expense report, a financial report, a tax report, a cost estimate report, etc.).

Figure 3:
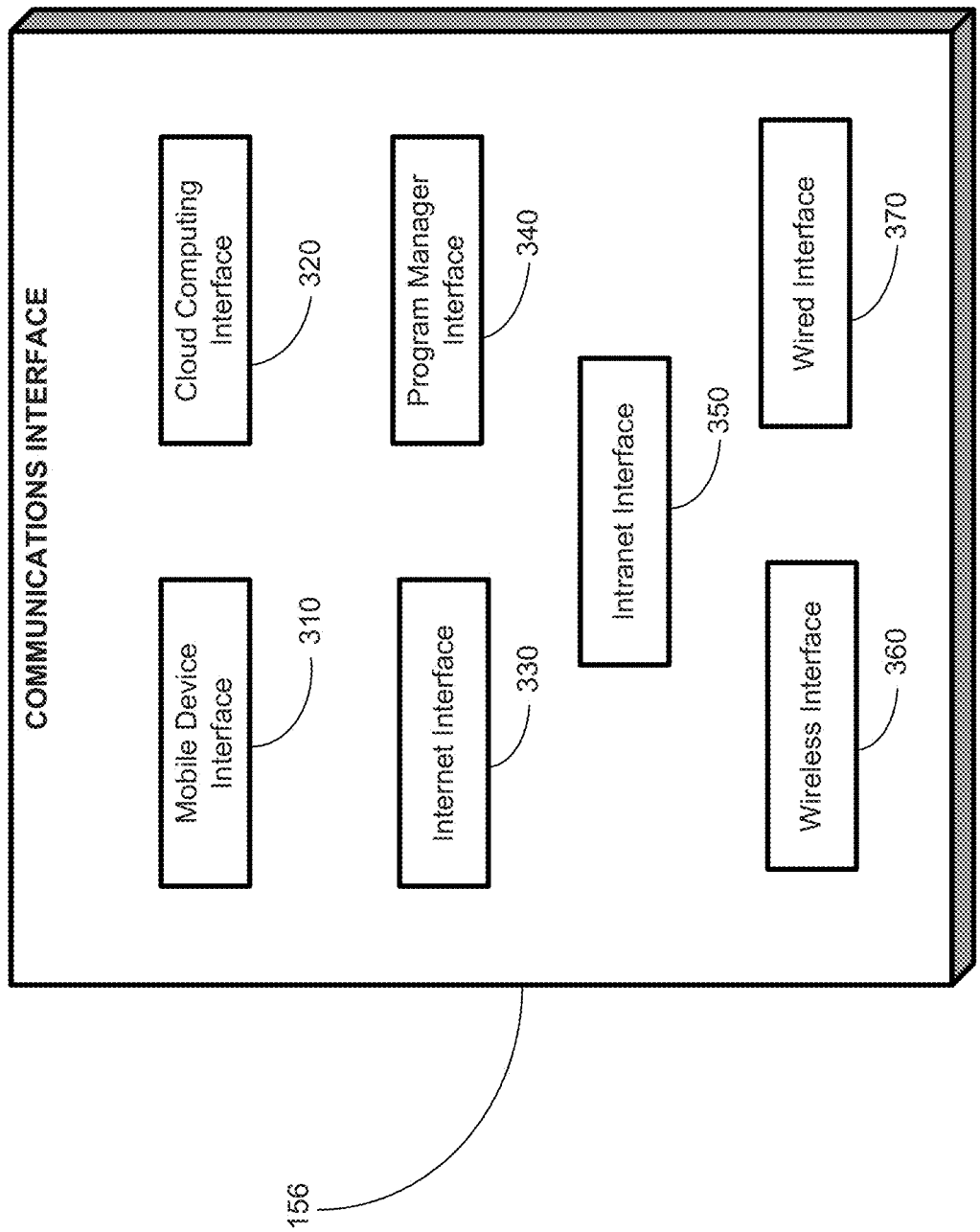
FIG. 3 illustrates a stylized block diagram depiction of a communications interface of the user entity of FIG. 2, in accordance with some embodiments of the present disclosure.

Turning now to FIG. 3, a stylized block diagram depiction of the communications interface 156 of FIG. 2, in accordance with some embodiments, is illustrated. The communications interface 156 provides for communications between the user entity 150 and the program manager 140 and/or the communications network 220. Through the communications network 220 (FIG. 2), the user entity 150 is capable of communicating with a remote device 210 (e.g., a mobile device). The communications interface 156 may comprise various interfaces that are capable of communicating with electronic devices using various types of communications methods. The communications interface 156 may comprise a mobile device interface 310 that will allow cellular network communications between the user entity 150 and a mobile device. The communications interface 156 may also comprise a cloud computing interface 320 that is capable of facilitating communications between the user entity 150 and any device via a cloud network. The communications interface 156 may also comprise an Internet interface 330 that provides for communications between the user entity 150 and any device via the Internet.

A program manager interface 340 in the communications interface 156 may provide for direct communications between the user entity 150 and the program manager 140. In some embodiments, a private communications network may be set up between the program manager 140 and the user entity 150. An intranet interface 350 in the communications interface 156 provides for communications between the user entity 150 and an intranet network, such as a private network.

The communications interface 156 may also comprise a wireless interface 360 and a wired interface 370. The wireless interface 360 provides for communications between the user entity 150 and any device via a wireless communications network, such as a wireless router attached to a device, e.g., 802.11 xx communications, Bluetooth communications, etc. The wired interface 370 may provide for wired communications between the user interface 150 and an electronic device. Wired communications may include an Ethernet wired communications link, a USB communications link, etc. Those skilled in the art, having benefit of the present disclosure would appreciate that the communications interface 156 may comprise other types of communications interfaces that provide for communications between the user entity 150 and other devices.

Figure 4:
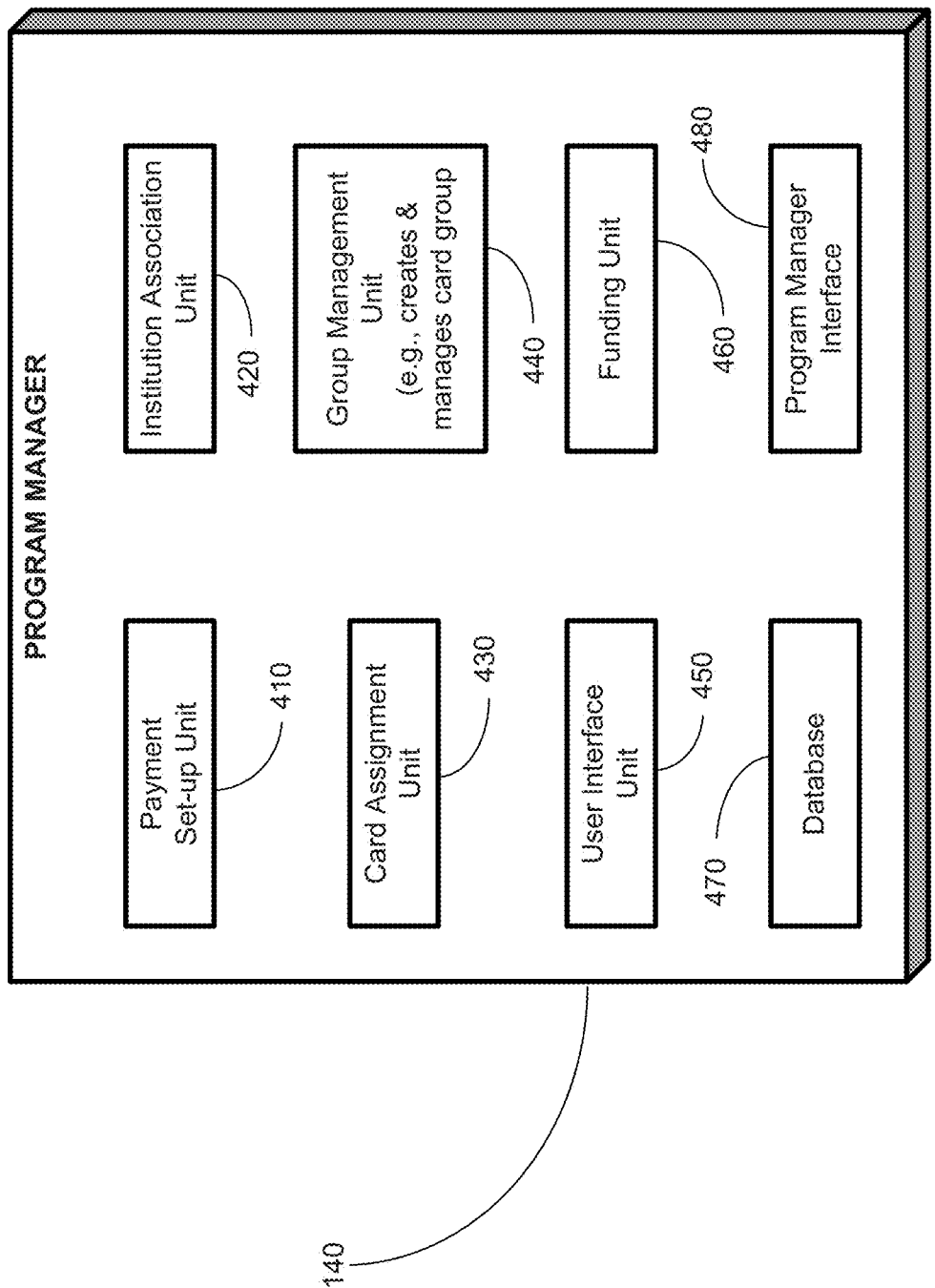
FIG. 4 illustrates a stylized depiction of a program manager of FIG. 1, in accordance with some embodiments of the present disclosure.

Turning now to FIG. 4, a block diagram depiction of the program manager 140 of the system 100 (FIG. 1), in accordance with embodiments herein is presented. The program manager 140 may be an entity that interfaces with the card issuing entity 120, the card processing unit 130 and the user entity 150 (FIG. 1) in order to facilitate transaction approval and automated funding of an expense card. In one embodiment, the program manager 140 provides for controlling financial transactions and/or approvals of financial transactions between a user entity 150 and a card processor 130. In one embodiment, the program manager 140 may interface with the administrator 154 of the user entity 150 for providing control over a card program that provides for automated approval and funding of expense cards.

The program manager 140 may comprise a payment set-up unit 410, an institution association unit 420, a card assignment unit 430, a group management unit 440, a user interface unit 450, a funding unit 460, a database unit 470, and a program manager interface 480. The units 410-480 of the program manager 140 may be comprised of hardware modules, software modules, and/or firmware modules.

The user interface unit 450 may provide for communications between the program manager 140 and the user entity 150, and more specifically, the administrator 154 and a user of an expense card. The payment set-up unit 410 may be configured to setup an infrastructure for funding an expense card. The method of payment, for example, may be set-up by the payment set-up unit 410. The payment set-up unit 410 is capable of receiving predetermined rules from the card processor 130, the card issuing unit entity 120, and/or the user entity 150. These rules may be dynamically modified. The payment method may include mechanisms for electronically transferring funds from a predetermined account to an expense card, and/or to a group account, which in turn may provide funding to expense cards associated with the group. In some embodiments, a graphical user interface (GUI) may be set up to allow for an administrator to log in and set-up a payment system. One example of GUI for setting up a payment method is exemplified in Appendix A. The exemplary GUI illustrated in Appendix A is provided for exemplary purposes, and those skilled in the art having benefit of the present disclosure may implement various other interfaces and remain within the spirit and scope of the present invention.

The institution association unit 420 of the program manager 140 may provide for associating an expense card payment method to a particular financial institution, such as the card issuing entity 120 (FIG. 1). A particular expense card may be classified as a particular type of card, such as a corporate expense card for example, and may be associated with a particular financial entity, such as the card issuing entity 120. The institution association unit 420 may be associated with one or more graphical user interface screen that may allow for an administrator to set-up an association for a particular expense card with a particular financial institution. One example of a GUI that may be used by the institution association unit 420 is provided in Appendix B.

The card assignment unit 430, along with the program manager 140 is capable of providing for assigning an expense card to a card user. A particular user may be assigned an expense card wherein various limitations and rules may be set-up for usage of the expense card. An Administrator may set-up the assignment of an expense card to a particular user. The card assignment unit 430 is capable of providing information regarding the card user to the administrator or a card group, and is capable of correlating an expense card to the user-profile of the user. One example of a GUI utilized for assigning an expense card to a user is exemplified in Appendix C.

The group management unit 440 provides for creating and managing an expense card group. An expense card group may be used to combine various card holders into a predetermined group; wherein rules may be set-up to control the operation of automated expense approvals for the group. For example, one division of a corporation may be selected for using expense cards. A subset of employees of that division may be assigned individual expense cards, wherein a set of rules may be used to provide guidance for usage of the expense cards. These rules may include limitations regarding maximum expenses, prior approvals being required for expenses, and/or automated approvals of expenses, among other rules. For example, particular rules may be set-up for providing a maximum amount that may be transferred to a particular card holder's expense account. The maximum amount be a function of a limit on allowable expenses by a user per unit of time (e.g., per day) and/or a function of the maximum amount of funding that is available to that particular group. The group management unit may utilize a GUI for allowing an administrator to set-up groups, and/or set up a group manager for controlling expense accounting of the group. Appendix D illustrates an exemplary GUI that may be utilized for creating and/or managing a card group. The group management unit 440 may also allow for adding or deleting individuals from a particular expense group.

The funding unit 460 of the program manager 140 may provide for funding of the expense cards. The funding may be based upon pre-determined rules that may apply uniquely for different card holders or for different groups. Once an expense card has been authorized for funding, the funding unit 460 may prompt movement of funds from a master account to an expense card. In another embodiment, once an expense card has been authorized for funding, the funding unit 460 may prompt movement of funds from a master account to a group account, wherein another entity such as the group manager, may prompt the funding unit 460 to move funds from the group account to the individual expense card. Alternatively, once a certain amount of funds are provided to the group account, all members of the group may use individual expense cards so long as individual limits associated with each expense card are not exceeded, and the total expenses of the group do not exceed the amount available in group account.

The database 470 may comprise one or more sub-databases of data portions that may store various rules and card holder data, as well as financial institution data and card issuance data. The database 470 may hold information with regard to the user entity 150, the administrator 154, the card holder 152, etc. The database 470 may also store funding data, account data, transaction history data, and/or information with regard to individual cardholder users. The database may store data for, and/or provide data to, various portions of the program manager 140, the user entity 150, the card processor 130, the card issuing entity 120, and/or the card originator 110. The database 470 may store information utilized by the various units 410-460 of the program manager 140. In some embodiments, database 470 may be a standard database accessible by normal addressing. In other embodiments, the database may be a relational database and/or a hierarchical database.

Figure 5:
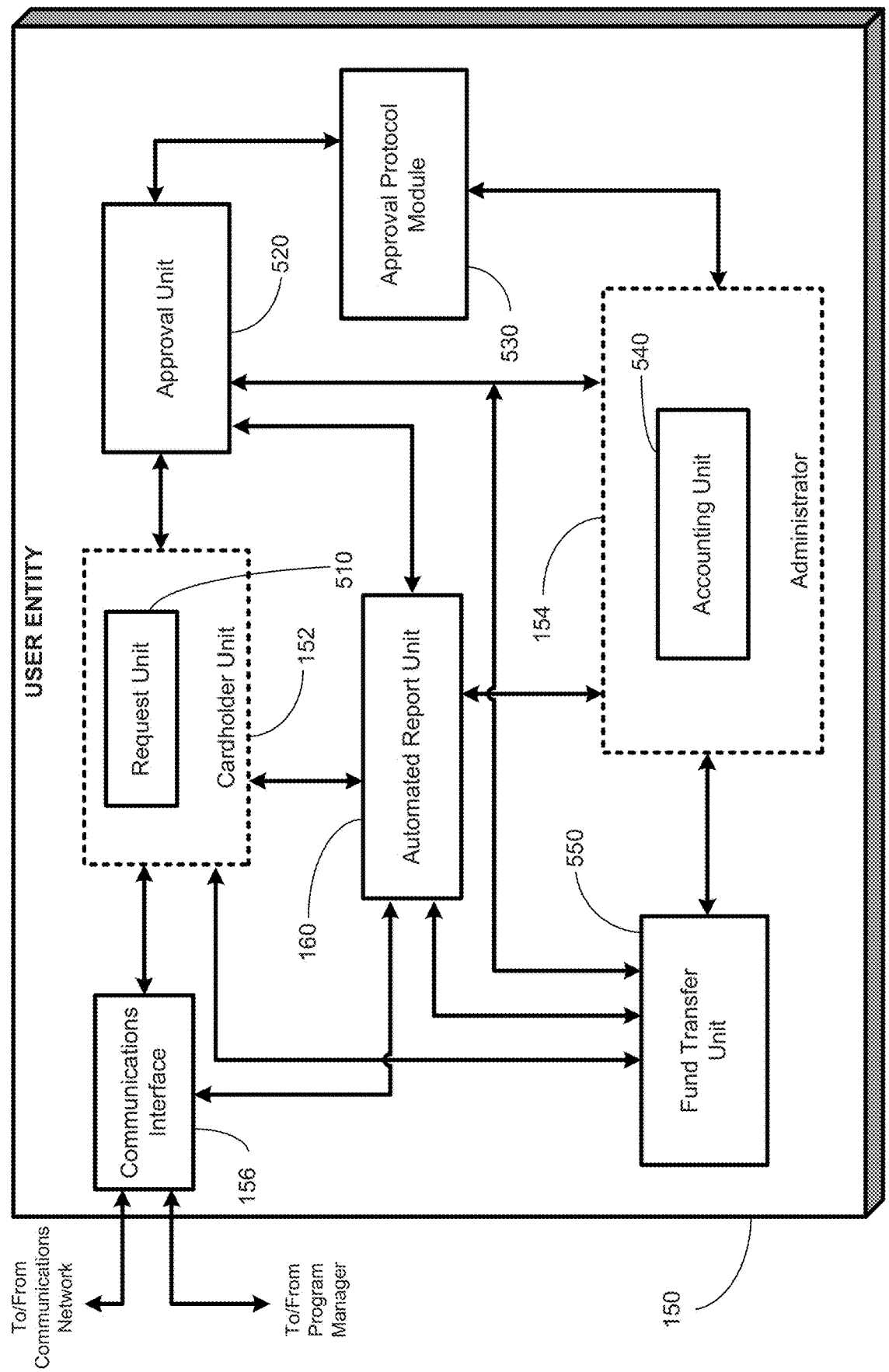
FIG. 5 illustrates a stylized block diagram depiction of the user entity of FIG. 2, in accordance with some embodiments of the present disclosure

Turning now to FIG. 5, a more detailed stylized block diagram depiction of the user entity 150, in accordance with some embodiments, is presented. As illustrated in FIG. 5, the communication interface 156 may communicate with the automated report unit 160, cardholder unit 152, the communication network 220, as well as with the program manager 140.

Various types of data may be sent and/or received by the user entity 150 via the communications interface 156. The cardholder unit 152, which may comprise a request unit 510 (described below), may provide request-information to the notification unit 160, which may process the request and provide notification information to the communications interface 160.

The card holder unit 152 described above may comprise a request unit 510. The request unit 510 may be capable of processing a request received from a user via the communications network 220 and/or the program manager 140. The request unit 510 is capable of providing feedback based on a request for funding. The request unit 510 may process a funding request for further approval, process an inquiry regarding additional information, provide a message to modify the request, and/or deny the request.

Information from the request unit 510 and other data from the card holder unit 152 may be provided to the approval unit 520. The approval unit 520 may be capable of making a determination whether to approve a request for funds. The approval unit 520 may be configured to perform various checks (rules test, threshold test, event test, etc.) prior to approving a request for funds. The approval unit 520 may comprise one or more rules that may be checked when determining whether to provide an approval or rejection of the request. The approval unit 520 may use one or more reports (e.g., expense reports, financial reports, etc.) to determine whether a request for funding should be approved.

In alternative embodiments, a separate module may be used to stores rules, thresholds, and/or event tests, and may be configured to receive further programming. For example, the user entity 150 may comprise an approval protocol module 530 that is capable of providing indications to the approval unit 520 for determining whether to approve or deny a request for funding. The approval protocol module 530 may be configured with one or more rules, thresholds, event checking functions, etc., in order to determine whether approval should be provided.

In addition to checking for rule based, event based or threshold based tests, the approval unit 520 may also interface with the administrator 154 in order to determine whether a request should be approved or denied. For example, the administrator 154 may comprise an accounting unit 540. The accounting unit 540 may comprise information relating to the account that may be used to provide the funding, the amount of funds available, and the amount of funds allowable for a particular user, etc. In some embodiments, this information may be acquired from financial reports generated by the automated report unit 160. Therefore, in addition to rules-protocol, threshold-protocol, or event-protocol, the approval unit 520 may also check accounting parameters in order to determine whether to provide an approval for a funding request. For example, if the rules, events or threshold protocols indicate that an approval can be made, but the accounting unit 540 provides information indicating there is a lack of funds in the master account, the approval unit 520 may reject the request. Further, the approval unit 520 may provide a reason for the rejection and an invitation to either modify the request or attempt the request at a later time.

The user entity 150 may also comprise a funds transfer unit 550. The funds transfer unit 550 may be in communication with the administrator 154 as well as the approval unit 520. Based upon an approval provided for funding, the fund transfer unit 550 may perform a fund transfer process in order to transfer funds to the card holder unit 152. The funds transfer unit 550 may receive instructions from the administrator 154 to perform a fund transfer transaction. The fund transfer unit 550 may also provide information to the approval unit 520 that a fund transfer cannot be made for one or more reasons, e.g., lack of funds, delay in replenishing funds into the master account, etc. Upon receiving such information, the approval unit 520 may reject a request, withdraw a prior approval of the request, or provide instructions to modify or resubmit the request at a later time.

Using the various modules shown in FIG. 5, an automated generation of a plurality of types of reports may be triggered by the automated report unit 160. In embodiment, the automated report unit 160 may receive user data from the cardholder unit 152. This data may include information as one or more activity of the user of a card, expenditure incurred by the card, dates and times of expenditures, etc. This data may be used by the automated report unit 160 to determine if an automated report generation is warranted, based upon predetermined rules. For example, if the user data indicates that a trip has been concluded, an expense report detailing various parameters of the expenditures relating to the trip may be triggered by the automated report unit 160.

Upon triggering the automated generation of a report, the automated report unit 160 may generate the report and may communicate with the accounting unit 540, which may use the report to ensure that sufficient funding is available prior to providing the funding for the other transactions. Upon generating one or more reports, the automated report unit 160 may notify various entities of the reports via the communications interface 156.

The various portions of the user entity 150 may be automated using one or more computing devices comprising hardware, software, and/or firmware modules. Further, the various portions of the user entity 150 illustrated in FIG. 5, may be comprised of hardware, firmware, and/or software modules.

Figure 6:
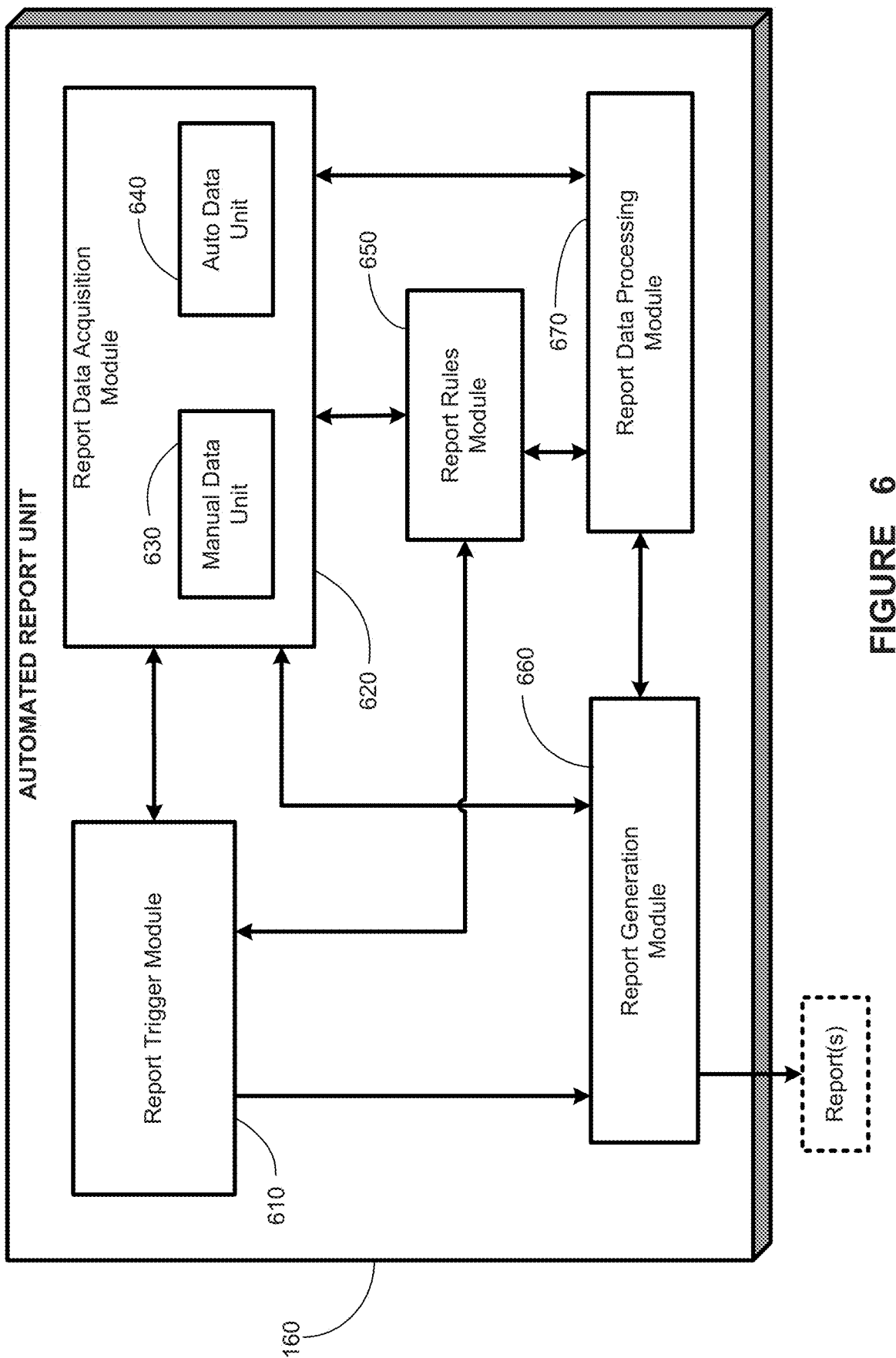
FIG. 6 illustrates a stylized block diagram depiction of an automated report unit of FIG. 5, in accordance with some embodiments of the present disclosure.

Turning now to FIG. 6, a stylized block diagram depiction of the automated report unit 160 of FIG. 1, in accordance to embodiments herein is illustrated. The automated report unit 160 may comprise a report trigger module 610, a report data acquisition module 620, a report rules module 650, a report data processing module 670, and a report generation module 660.

The report trigger module 610 may receive data that may trigger the generation of a report. The data received by the report trigger module 610 may be sent by another entity, or may be received as a result of polling various entities for data. Based upon data received by the automated report unit 160, the report trigger module 610 may trigger the auto-generation of one or more reports. The data used by the report trigger module may be acquired by the report data acquisition module 620.

The report data acquisition module 620 may be capable of acquiring various data sets that may be useful for auto-generating one or more reports. The report data acquisition module 620 may comprise a manual data unit 630 and an auto data unit 640. The manual data unit 630 may request data that may be manually provided by a user. The auto data unit 640 may automatically receive data and/or scan or poll to actively collect data.

In one embodiment, the report data acquisition module 620 may scan for an event that may warrant the triggering of a report according to predetermined rules. For example, based upon a particular event, such as a completion of a business trip, a completion of a project, a mandate to an employee to perform a certain task, etc., an automatic triggering of an auto-report generation may be prompted. The report data acquisition module 620 may scan for various predetermined events to determine whether or not to trigger a transaction. For example, upon expiration of a predetermined time period, a financial report may be automatically generated prior to an automated replenishment of an expense account. Another example of an event that may trigger an automated report is the completion and submission of a project or a trip, which may prompt the auto-generation of an expense report and/or a financial report. These reports may then be used to perform a replenishment of an expense account and/or other actions.

These auto-generations of reports may be controlled using one or more rules associated a report rules module 650. The report rules module 650 may comprise various rules that may be programmed, wherein these rules may be used to determine whether to trigger an auto report, the type or report to generate, the type of data to acquire to generate the report, the timing of the report, etc. Any number of events, rules, thresholds may be programmed into the report rules module 650 that such that they could cause the triggering of an automated generation of a report.

The report data acquisition module 620 may also scan for one or more data sets that may be compared to predetermined corresponding threshold, which may be stored in the report rules module 650. Based upon this threshold, the report trigger module 610 may determine that a threshold-triggering circumstance has occurred, in light of the rules and threshold of the report rules module 650. For example, if the expense account of a user falls below a threshold level, an automated expense report and a financial report may be generated prior to an automated replenishment of the account.

In some embodiments, the various criteria, rules, thresholds of the report rules module 650 may be modified and/or updated by a remote entity. Upon satisfying the criteria for triggering an auto-generation of a report, the report trigger module 610 may prompt the execution of an automated generation of the report, which may be performed by the report generation module 660. A more detailed description of the report trigger module 610 is provided in FIG. 7 and accompanying description below.

The report data processing module 670 may be capable of processing various data sets and using the rules and/or thresholds described herein, and determines the type of report that is to be automatically generated. Based upon processing of various activity data, event data, expenditure data, financial date, and/or the like, the report generation module 670 may automatically generate one or more reports (e.g., financial, expense, tax, cost estimate reports).

Figure 7:
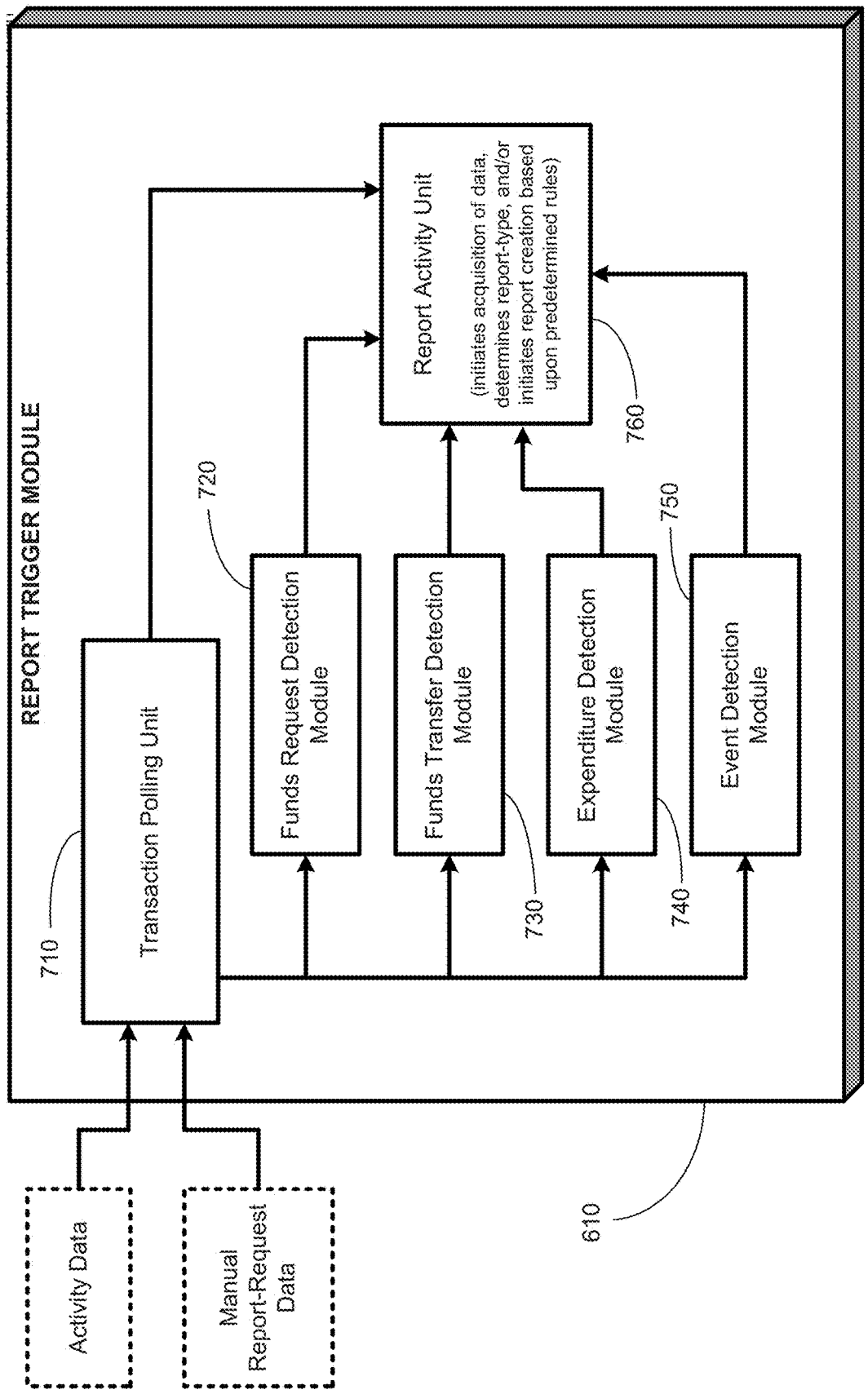
FIG. 7 illustrates a stylized block diagram depiction of an report trigger module of FIG. 6, in accordance with some embodiments of the present disclosure.

Turning now to FIG. 7, a block diagram depiction of the report trigger module 610 of FIG. 6, in accordance with embodiments herein is illustrated. A transaction polling unit 710 may receive activity data and/or manual report-request data. The activity data may comprise various information, such as an expense activity performed by the user, the amount of expenses incurred, the timing of the activity, etc. The transaction polling unit 710 is capable of prompting the polling of various data sets from external entities. Data from the transaction polling unit 710 may be sent to a funds request detection module 720, a funds transfer detection module 730, an expenditure detection module 740, and an event detection module 750. The transaction polling unit 710 may poll activity or manual requests for data, which may cause one of the detection modules 720-750 to detect a report-triggering activity.

Based upon data from the transaction polling unit 710, the funds request detection module 720 may detect a funds request based on this data, wherein the data may include the amount of the request, the timing of the request, etc. The funds transfer detection module 730 may determine that the data indicates that a funds transfer has been requested. Based upon related data, the expenditure detection module may determine an expense incurred by a user, including the amount of the expenditure and/or the timing of the expenditure. Further, based upon the data from the transaction polling unit 710, the event detection module may detect an event that may be relevant to a financial transaction, such as approval or conclusion of a trip, expiration of a time period for a new report, etc. Based upon information from the transaction polling unit 710 and/or the modules 720-750, a report activity unit 760 may initiate acquisition of more data, determine a report-type for auto-generation of the report, and initiate the automatic generation of one or more report(s).

Figure 8:
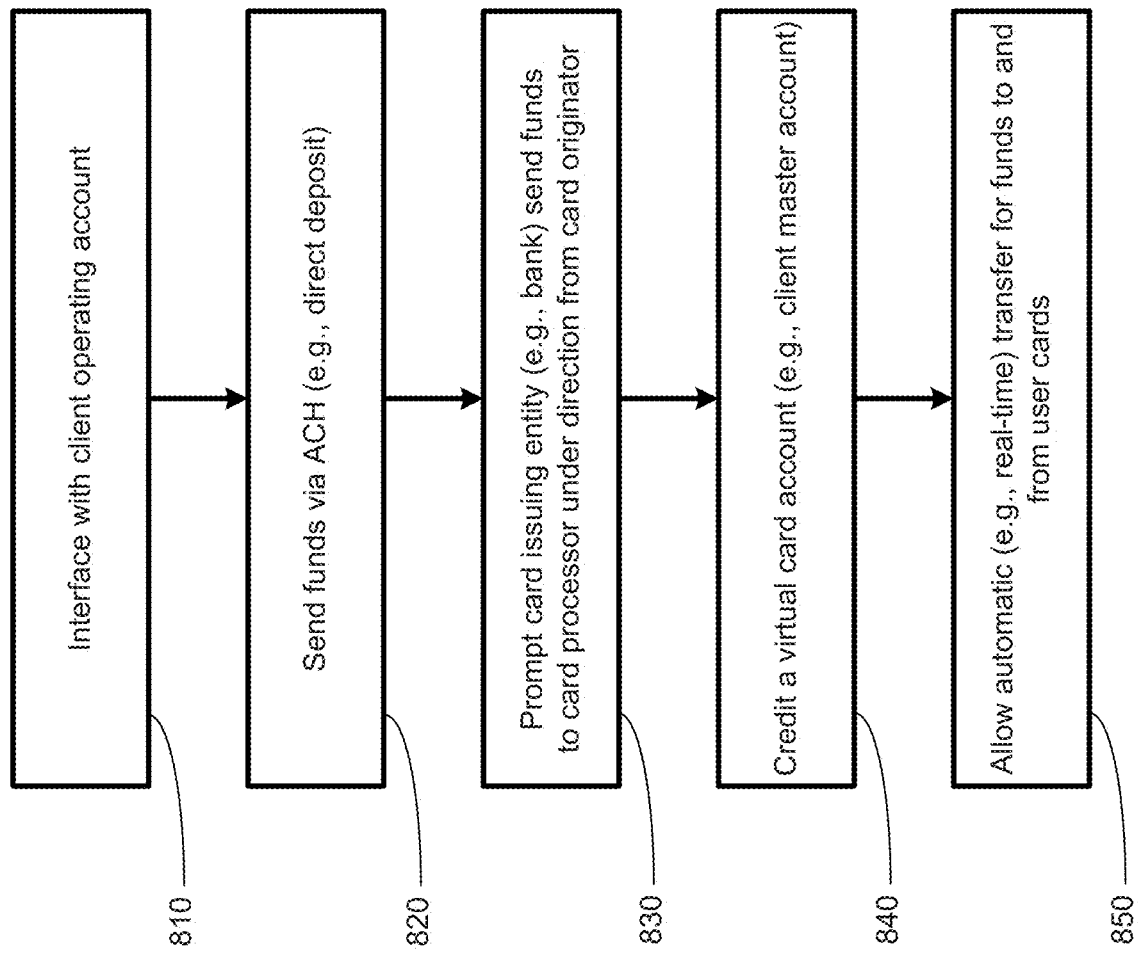
FIG. 8 illustrates a flowchart depiction of a performing a funds flow process, in accordance with some embodiments of the present disclosure.

Turning now to FIG. 8, a flowchart depiction of a funds flow process, in accordance with embodiments herein, is illustrated. In one embodiment, the program manager 140 may interface with a client operating account of the user entity 150 (block 810). In one embodiment, this interaction may be prompted by the user entity 150 in response to an expense funding request. In another embodiment, this interaction may be prompted by an indication to automatically replenish an expense account. The automatic replenishment may be responsive to the detection of an event (e.g., the end of a business trip), or passing of a predetermined time window (e.g., replenishment at the end of every month).

In some embodiments, the card issuing entity 120, such as a bank, may interact with the user entity 150 via a program manager 140. The interfacing of the program manager 140 with the client operating account may include establishing a communications protocol with the client operating account. Upon establishing a communications protocol with the client operating account, one or more transactions may be made, e.g., providing funding to the account or extracting funds from the account.

Upon interfacing with the client operating account, funds may be provided to the account (block 820). In some embodiments, the funds may be transferred electronically, e.g., an automated clearing house (ACH) electronic network may provide a direct deposit to the client operating account. Upon providing the funds, a prompt may be made to the card issuing entity 120 (e.g., a bank) to send funds to the card processor (block 830). The prompting of the card issuing entity 120 may be performed by the program manager 140. The transfer of the funds to the card processor 130 may be performed under the direction of the card originator via the program manager 130.

A virtual card account, e.g., a client master account, may be credited upon funding (block 840). The client master account may be part of the card holder unit 152 of the user entity 150. Once a virtual card account is funded, automated transfer of funds to and from user cards may be allowed (block 850). The automated transfer of funds to and from the user cards may be performed in a real-time or a near real-time manner. Exemplary embodiments of performing the automated real-time transfer and approval are described below. The automated transfer of funds may be made to user cards of employees, for example, for funding various activities, (e.g., travel, other expenditures) performed by the employee on behalf of the user entity 150. Those skilled in the art, having benefit of the present disclosure would appreciate that other methods of providing funds to a virtual card account, such as a client master account, may be performed while remaining within the spirit and scope of the embodiments disclosed herein.

Figure 9:
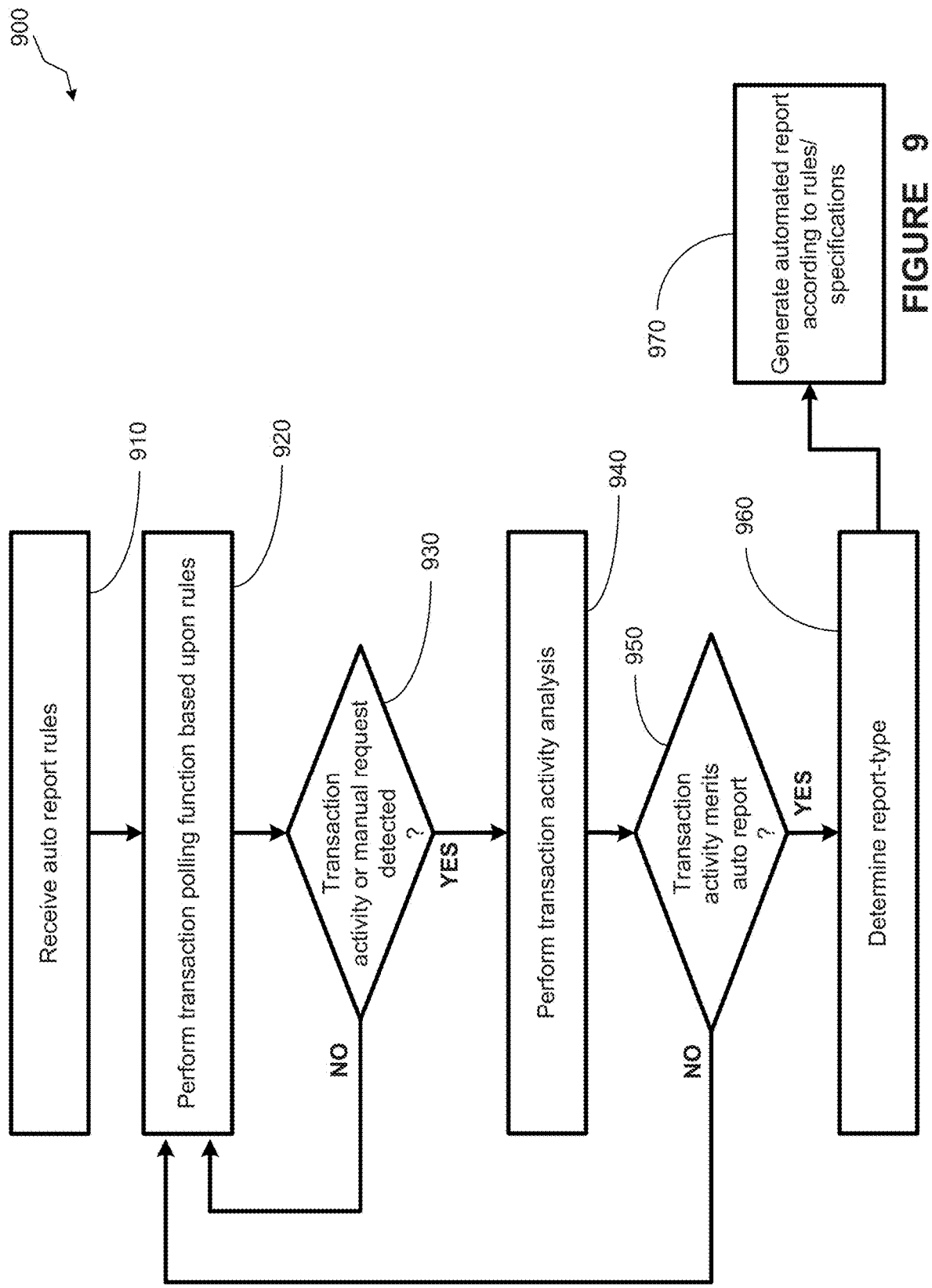
FIG. 9 illustrates a flowchart depiction of a process of triggering an automated report, in accordance with some embodiments of the present disclosure.

Turning now to FIG. 9, a flowchart depiction of a method of triggering an automated generation of a report, in accordance with embodiments herein, is illustrated. The user entity 150 may receive various rules and/or thresholds relating to automated generation of reports (block 910). Based upon predetermined rules, the user entity 150 may perform a transaction polling function for acquiring data relating to activity that may prompt an automated generation of one or more reports (block 920). A more detailed description of the transaction polling function is provided in FIG. 10 and accompanying description below.

Upon acquiring data sets based upon the transaction polling function, a determination may be made whether transaction activity or a manual request that may prompt an automated generation of one or more reports has been detected (block 930). If such activity or request has not been detected, the process reverts back to the transaction polling function (back to block 920). However, if such activity or request has been detected, a transaction activity analysis may be performed (block 940). A more detailed description of the transaction activity analysis is provided in FIG. 11 and accompanying description below.

Upon performing the transaction activity analysis, a determination may be made as to whether the transaction activity merits an automated generation of one or more reports (block 950). If an automated generation of one or more reports is not merited, then the process reverts back to the transaction polling function. If an automated generation of one or more reports is merited, then the type of report(s) to be generated is determined (block 960). For example, if a request for funding for an activity is detected and one or reports are determined to be merited for auto-generation, an expense report showing previous expenses for a similar activity and a financial report showing available funds may be deemed to be useful. Upon determining the types of report(s) to be generated, automated report(s) may be generated based upon predetermined rules and specifications for such reports (block 970).

Figure 10:
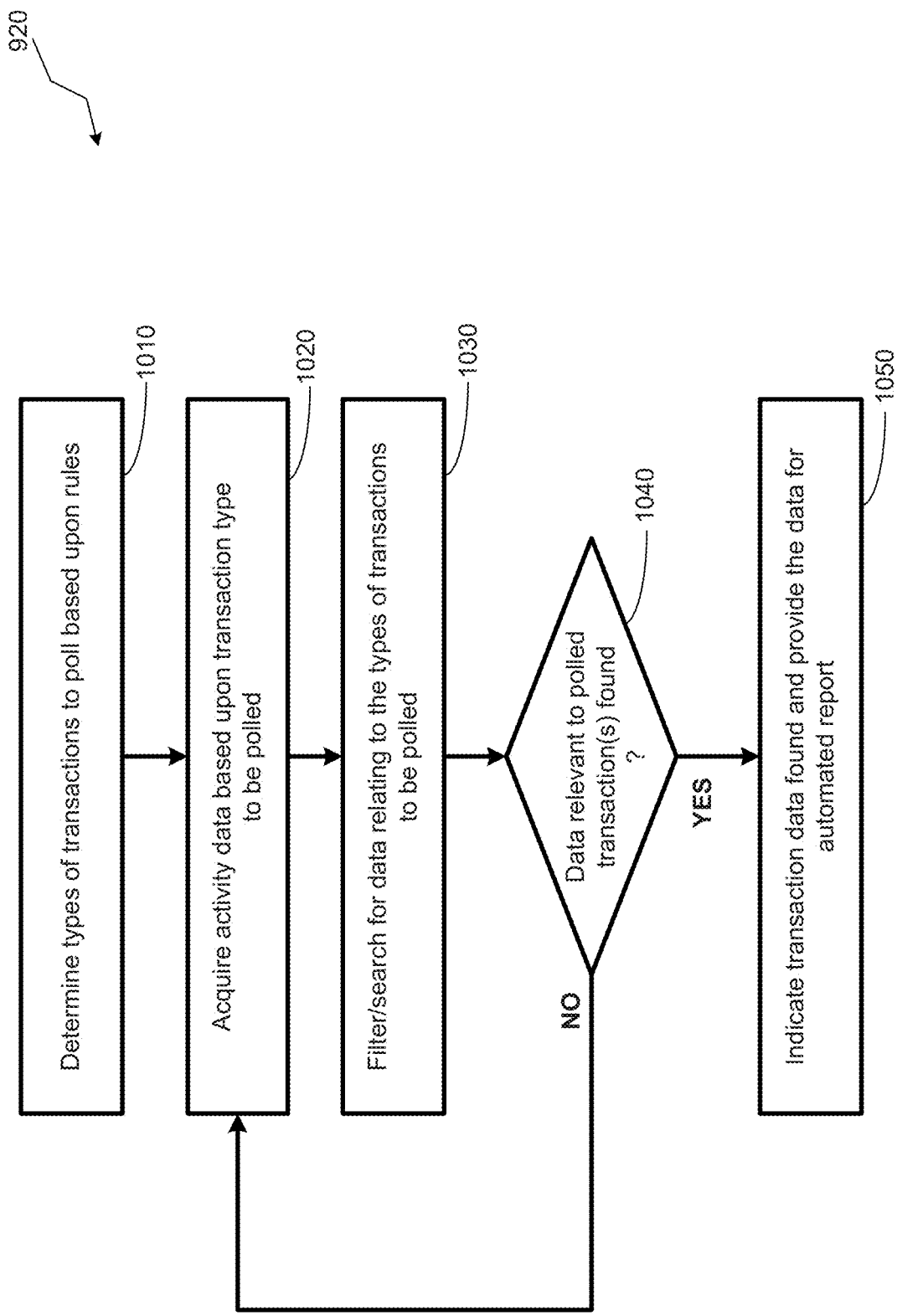
FIG. 10 illustrates a flowchart depiction of a process of performing transaction polling function of FIG. 9, in accordance with some embodiments of the present disclosure.

Turning now to FIG. 10, a flowchart depiction of performing the transaction polling function, in accordance with embodiments herein is provided. The user entity 150 may determine the types of transactions to poll (block 1010). The type of transactions to poll may be dictated by predetermined rules and/or threshold exemplified above. Based upon the type of transactions to poll, activity data may be acquired (block 1020). For example, if an expense report is to be automatically generated based upon completion of a funded event, the user entity 150 may acquire data indicative of a conclusion or termination of an activity, such as business travel, as well as other parameters, such as expenditures incurred, etc. Upon acquiring such data, the user entity 150 may filter and/or search the acquired data sets to find data relating to the type of transactions to be polled (block 1030). For example, the acquired data sets may be searched for data indicative of the completion of a business trip, expenditures incurred, dates of expenditures, etc.

Upon filtering or searching the acquired data sets for the information relating to the types of transaction to be polled, a determination may be made as to whether data relevant to the polled transaction(s) has been found (block 1040). If data relevant to the polled transaction(s) has not been found, the process reverts back to block 1020 for acquiring activity data. If data relevant to the polled transaction(s) has been found, an indication that relevant transaction data have been found, and the relevant data is provided for generating the auto-report(s) (block 1050).

Figure 11:
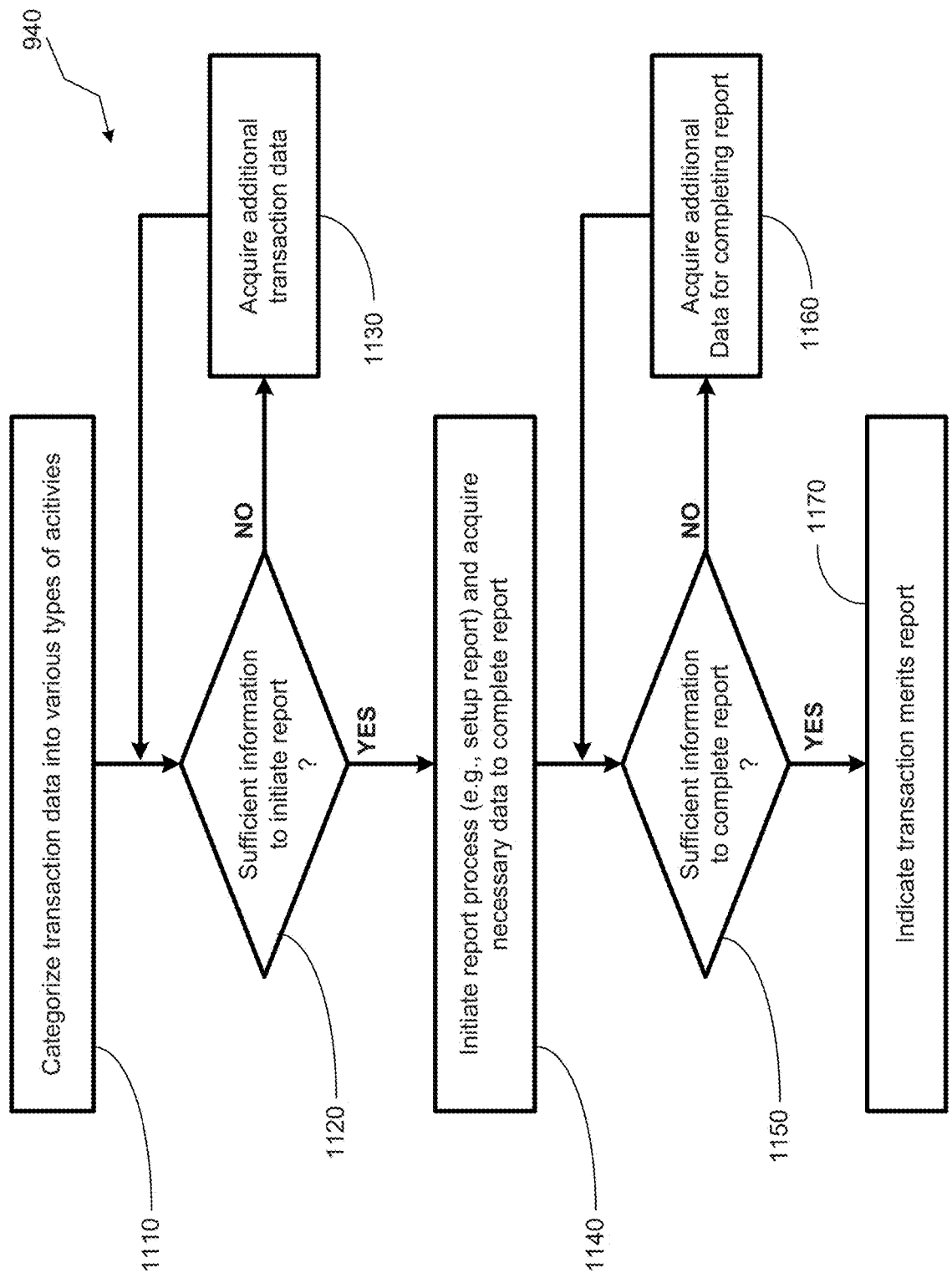
FIG. 11 illustrates a flowchart depiction of a process of performing transaction analysis of FIG. 9, in accordance with some embodiments of the present disclosure; and While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

Turning now to FIG. 11, a flowchart depiction of a method of performing the transaction analysis of FIG. 9, in accordance with embodiments herein, is illustrated. The transaction data may be categorized into various types of activates (block 1110). For example, data sets may be categorized into data that may be used for triggering an expense report, a financial report, a tax report, a cost estimate report, and/or the like. A determination may be made as the whether sufficient information is available in order to initiate one or more reports (block 1120). If sufficient information is not available, a step of acquiring additional transaction data may be performed (block 1130), which may be followed by another check for data sufficiency (block 1130 to 1120). If sufficient information is available, the report process may be initiated and data necessary to complete the report may be acquired (block 1140). Initiating the report process may include setting up various parameters of the report and determining whether additional data to complete the report is required.

Once the report process is initiated and additional data is acquired, a determination is made as to whether sufficient information is available for completing the report (block 1150). If sufficient information for completing the report is not available, additional data for completing the report may be acquired (block 1160), which may be followed by another check for data sufficiency (block 1160 to 1150). If sufficient information for completing the report is available, an indication is provided that the transaction merits at least one report (block 1170).

In this manner, an automated triggering and completion of one or more reports are performed in accordance with embodiments herein.

The methods depicted in FIGS. 8-11 and described above may be governed by instructions that are stored in a non-transitory computer readable storage medium and that are executed by, e.g., a processor in a computing device. Each of the operations shown in FIGS. 8-11 may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:

1. A non-transitory computer readable program storage unit encoded with instructions that, when executed by a computer, perform a method for automatically providing a report based upon a request for funding of an activity, comprising:

determining in real time, by said computer, a type of transaction to poll based upon a predetermined set of rules associating types of transactions with a completion of a business trip, wherein said rules are stored in and provided by a database, and said rules are set up in said database by an administrator by way of a graphical user interface (GUI);

performing in real time, by said computer, transaction polling to acquire activity data associated with said activity relating to a user of an account;

determining in real time, by said computer, if said activity relates to funding of said account;

determining, by said computer in real time in response to said activity relating to said funding, if said data indicates that a report is to be automatically generated by said computer based upon automatically and in real time filtering, by said computer, identifying, in real time, by said computer, data relating to said completion of said business trip, wherein said data relating to said completion of said business trip comprises dates of travel, types of expenditures incurred, amounts of expenditures incurred, or two or more thereof;

in response to detecting, in real time, by said computer, an event of said completion of said business trip, automatically replenishing the user's account based upon determining an expense incurred by the user, including the amount of the expenditure and the timing of the expenditure;

generating, automatically and in real time, by said computer, said report based upon determining, by said computer, that said filtered data indicates that said report is to be automatically and in real time generated, including determining in real time, by said computer, whether sufficient funds are available for funding said request;

determining in real time, by said computer, whether said report meets all requirements for funding;

triggering, automatically and in real time, by said computer, a funding transaction for providing funding into said account in response to determining in real time, by said computer, that said report meets all requirements for funding;

determining, automatically and in real time, by said computer, whether said request is to be denied or whether a message to modify said request is to be provided, in response to determining, by said computer, that said report fails to meet all requirements for funding;

in response to determining said request is denied, automatically and proactively transmitting a notification to the user remote device via an interactive communication channel transmitted as a text message, an email message, or a social network message or post;

prompt, automatically and in real time via a GUI of the user remote device, a modification of said report, in response to determining said request is denied; and upon receiving the modification of the requests, performing in real time, by said computer, said funding transaction in response to said triggering, thereby scheduling a transfer of funding.

2. The non-transitory computer readable program storage unit of claim 1, wherein generating automatically said report comprises generating an expense report based upon conclusion of said activity of said user.

3. The non-transitory computer readable program storage unit of claim 1, wherein generating automatically said report comprises automatically generating, by said computer, at least one of an expense report, a finance report, an earnings report, a profit report, an insurance report, or a stock report.

4. The non-transitory computer readable program storage unit of claim 1, further comprising triggering, by said computer, said generation of said report, by said computer, based upon at least one of said completion of said business trip, a completion of a project, an expenditure, or a request for funding.

5. The non-transitory computer readable program storage unit of claim 1, further comprising triggering, automatically, by said computer, a request for additional data in response to determining, by said computer, that said report fails to meet all requirements for funding.

6. The non-transitory computer readable program storage unit of claim 1, wherein receiving data associated with said activity relating to said user of said account further comprises performing a transaction polling function based upon at least one rule, said transaction polling comprises acquiring data relating to at least a transaction related to said completion of a business trip, wherein said data relating to said completion of said business trip comprises dates of travel, types of expenditures incurred, amounts of expenditures incurred or two or more thereof.

7. A method for providing an automated report regarding a funding request, comprising:

receiving in real time, by a computer, at least one rule for generating an automated report, wherein said at least one rule is stored in and provided by a database, and said rule or rules is or are set up in said database by an administrator by way of a graphical user interface (GUI);

determining in real time, by said computer, a type of transaction to poll based upon said received at least one rule associating types of transactions with a completion of a business trip;

performing in real time, by said computer, a transaction polling function based upon said at least one rule, wherein said transaction polling comprises polling an entity for acquiring activity data associated with the activity relating to a user of an account;

filtering automatically and in real time, by said computer, said activity data using said at least one rule to identify data relating to said completion of said business trip, wherein said data relating to said completion of said business trip comprises dates of travel, types of expenditures incurred, amounts of expenditures incurred, or two or more thereof;

in response to detecting, in real time, by said computer, an event of said completion of said business trip, automatically replenishing the user's account based upon determining an expense incurred by the user, including the amount of the expenditure and the timing of the expenditure;

determining in real time, by said computer, whether to generate said automated report based upon said filtered data, including determining in real time, by said computer, whether sufficient funds are available for funding said request;

determining in real time, by said computer, a report-type in response to determining, by said computer, to generate said automated report; generating said automated report based upon said report type;

triggering, automatically and in real time, by said computer, a funding transaction for providing funding into an account in response to determining in real time, by said computer, that said report meets all requirements for funding, including determining in real time, by said computer, whether sufficient funds are available for funding said request; and determining, automatically and in real time, by said computer, whether said request is to be denied or whether a message to modify said request is to be provided, in response to determining, by said computer, that said report fails to meet all requirements for funding;

in response to determining said request is denied, automatically and proactively transmitting a notification to the user remote device via an interactive communication channel transmitted as a text message, an email message, or a social network message or post;

prompt, automatically and in real time via a GUI of the user remote device, a modification of said report, in response to determining said request is denied; and upon receiving the modification of the requests, performing in real time, by said computer, said funding transaction in response to said triggering, thereby scheduling a transfer of funding.

8. The method of claim 7, wherein determining, by said computer, said report type comprises determining, by said computer, whether said automated report is to be at least one of an expense report, a finance report, an earnings report, a profit report, an insurance report, or a stock report.

9. The method of claim 7, wherein performing, by said computer, a transaction polling function based upon said at least one rule provided by said database comprises:

determining, by said computer, at least one type of transaction to poll based upon said rule;

acquiring, by said computer, activity data based upon transaction type to poll;

acquiring, by said computer, data relating to said type of transaction to poll;

determining, by said computer, whether data relating to said type of transaction to poll is relevant to said report type;

indicating, by said computer, that data for generating said automated report has been acquired; and providing, by said computer, said data for generating said automated report.

10. The method of claim 7, further comprising triggering, automatically, by said computer, a request for additional data in response to determining, by said computer, that said report fails to meet all requirements for funding.

11. An apparatus including a processor and a memory providing an automated report, comprising:

a report rules module stored in said memory and executed by said processor adapted to receive in real time at least one rule for generating an automated report, wherein said at least one rule is stored in and provided by a database, and said rule or rules is or are set up in said database by an administrator by way of a graphical user interface (GUI);

a report data acquisition module stored in said memory and executed by said processor adapted to determine in real time a type of transaction to poll based upon said at least one rule associating types of transactions with a completion of a business trip, perform in real time a transaction polling function based upon said at least one rule, wherein said transaction polling comprises acquiring data relating to a transaction, and filter automatically and in real time said data to identify data relating to said completion of said business trip, wherein said data relating to said completion of said business trip comprises dates of travel, types of expenditures incurred, amounts of expenditures incurred, or two or more thereof;

an automatic replenishment module stored in said memory and executed by said processor adapted to automatically replenish the user's account based upon determining an expense incurred by the user, including the amount of the expenditure and the timing of the expenditure, in response to detecting, in real time, by said computer, an event of said completion of said business trip;

a report trigger module stored in said memory and executed by said process or adapted to determine in real time whether to generate said automated report based upon said filtered data;

a report data processing module stored in said memory and executed by said processor adapted to determine in real time a report type in response to determining to generate said automated report;

a report generation module stored in said memory and executed by said processor adapted to generate in real time said automated report based upon said report type;

a funds transfer unit stored in said memory and executed by said processor adapted to trigger, automatically and in real time, a funding transaction for providing funding into an account in response to determining that said report meets all requirements for funding, including determining in real time whether sufficient funds are available for funding said request, and perform in real time said funding transaction in response to said triggering, thereby scheduling a transfer of funding;

a request processing module stored in said memory and executed by said processor adapted to determine, automatically and in real time, by said computer, whether said request is to be denied or whether a message to modify said request is to be provided, in response to determining, by said computer, that said report fails to meet all requirements for funding;

a communication module adapted to, in response to determining said request is denied, automatically and proactively transmit a notification to a user remote device via an interactive communication channel transmitted as a text message, an email message, or a social network message or post; and the user remote device, comprising a GUI adapted to prompt a modification of said report, in response to determining said request is denied.

12. The apparatus of claim 11, wherein said report trigger module comprises:

a transaction polling unit stored in said memory and executed by said processor adapted to poll at least one transaction for triggering a report generation;

a funds request detection module stored in said memory and executed by said processor adapted to detect a funds request for triggering a report generation;

a funds transfer detection module stored in said memory and executed by said processor adapted to detect a transfer of funds for triggering a report generation;

an expenditure detection module stored in said memory and executed by said processor adapted to detect an expenditure transaction for triggering a report generation;

an event detection module stored in said memory and executed by said processor adapted to detect an event for triggering a report generation; and a report activity unit stored in said memory and executed by said processor adapted to perform at least one of initiating an acquisition of data or initiates said generation of said report.

13. The apparatus of claim 11, wherein said funds request detection module stored in said memory and executed by said processor is further adapted to trigger, automatically, a request for additional data in response to determining that said report fails to meet all requirements for funding.

* * * * *